United States Patent
Carton

(10) Patent No.: US 6,915,626 B2
(45) Date of Patent: Jul. 12, 2005

(54) BLANKING-PLUG SYSTEM FOR BLANKING OFF AN ORIFICE OF A PIPE, PARTICULARLY FOR BLANKING OFF AN ORIFICE OF A DUCT FOR INTRODUCING AIR INTO THE COMBUSTION CHAMBER OF A RAMJET

(75) Inventor: Laurent Carton, Saint Florent sur Cher (FR)

(73) Assignee: MBDA France, Paris (FR)

( * ) Notice: Subject to any disclaimer, the term of this patent is extended or adjusted under 35 U.S.C. 154(b) by 57 days.

(21) Appl. No.: 10/419,823

(22) Filed: Apr. 22, 2003

(65) Prior Publication Data

US 2004/0020187 A1 Feb. 5, 2004

(30) Foreign Application Priority Data

May 27, 2002 (FR) .......................................... 02 06431

(51) Int. Cl.⁷ ............................................... F02K 7/18
(52) U.S. Cl. ............................. 60/225; 60/245; 60/767
(58) Field of Search ................... 60/225, 245, 767–769; 239/265.15; 220/261, 265, 266, 277

(56) References Cited

U.S. PATENT DOCUMENTS

| | | | | |
|---|---|---|---|---|
| 3,038,303 A | * | 6/1962 | Gose ........................... | 60/254 |
| 3,674,227 A | * | 7/1972 | Jacobson et al. ........... | 102/293 |
| 3,768,255 A | * | 10/1973 | Barnes et al. ................. | 60/245 |
| 4,391,094 A | * | 7/1983 | Engel et al. ................... | 60/245 |
| 4,434,905 A | * | 3/1984 | Ou et al. ..................... | 220/89.2 |
| 5,784,877 A | * | 7/1998 | Hewitt ......................... | 60/245 |
| 5,993,921 A | * | 11/1999 | Hunn ......................... | 428/34.4 |
| 6,557,339 B2 | * | 5/2003 | Demay et al. ................ | 60/245 |
| 6,725,664 B2 | * | 4/2004 | Carton ......................... | 60/767 |

FOREIGN PATENT DOCUMENTS

FR    2813344    3/2002

OTHER PUBLICATIONS

Preliminary Search Report dated Feb. 10, 2003 (in English).

* cited by examiner

Primary Examiner—Ted Kim
(74) Attorney, Agent, or Firm—Stevens, Davis, Miller & Mosher, LLP

(57) ABSTRACT

A blanking-plug system for blanking off an orifice of a pipe, particularly for blanking off an orifice of a duct for introducing air into the combustion chamber of a ramjet.

The blanking-plug system (16) comprises at least one blanking plug (15) comprising a glass plate (18) which is able to completely blank off said orifice (8) of the pipe (7); and at least one device (17) for destroying said glass plate (18) of said blanking plug (15). Said blanking plug (15) additionally comprises a plurality of elastomer protective elements (21) which are fixed on at least one first face (22) of said glass plate (18) which is likely to be subject to attack, these elements being separated from one another by a predetermined maximum distance at most, and completely covering said first face (22).

11 Claims, 2 Drawing Sheets

BLANKING-PLUG SYSTEM FOR BLANKING OFF AN ORIFICE OF A PIPE, PARTICULARLY FOR BLANKING OFF AN ORIFICE OF A DUCT FOR INTRODUCING AIR INTO THE COMBUSTION CHAMBER OF A RAMJET

The present invention relates to a blanking-plug system for blanking off a pipe. Although not exclusively, it relates more specifically to a blanking-plug system for blanking off an orifice of a duct for introducing air into the combustion chamber of a ramjet.

It is known that ramjets consist essentially of a combustion chamber, ending in a jetpipe and into which liquid or gaseous fuel (which may be obtained from solid fuel) and combustion air are introduced. This combustion air is introduced into said combustion chamber through at least one air inlet duct, of the air inlet type, which captures air as said ramjet (or the aerial vehicle bearing it) moves through the ambient air.

Thus, for a ramjet to work, said ramjet needs to have already been given a speed through the ambient air.

To do this, it is commonplace, in an initial phase of operation corresponding to bringing said ramjet up to speed, to operate it as a rocket, using a consumable auxiliary thruster arranged in said combustion chamber and then, when said ramjet has reached a predetermined speed and said auxiliary thruster has been completely consumed, there is a switch to actual ramjet operation, with fuel and combustion air injected into the combustion chamber.

Such dual-mode (rocket mode, followed by ramjet mode) operation dictates the provision of a blanking-plug system in order, on the one hand, to blank off an orifice of said air inlet duct or air inlet during operation as a rocket, so as to avoid leaks, through said orifice, of the gases generated by said consumable auxiliary thruster and, on the other hand, to open up said orifice of the air inlet duct or air inlet for operation in actual ramjet mode.

It is known practice (see, for example, document JP-03057867) to use, by way of a blanking-plug system, a swinging hatch with controlled opening. However, in this case, it is generally necessary to provide a particularly sophisticated control system, avoiding any inadvertent opening of the hatch, which could lead to premature firing of said consumable auxiliary thruster and therefore damage the carrier (airplane for example) of a missile equipped with said ramjet. In addition, and above all, this hatch remains present on board the ramjet after the air inlet duct has been opened, and this of course causes problems of space occupation and leads to the presence of a parasitic mass during ramjet operation.

To remedy this last disadvantage, document FR-2 813 344 describes a blanking-plug system for an orifice for introducing combustion air into the combustion chamber of a ramjet, which comprises:
  a glass blanking plug or cover which completely blanks off said orifice during the initial phase; and
  a destroying device, namely a mechanical percussion device, which destroys this glass blanking plug prior to ramjet operation. During this destruction, the glass blanking plug is broken up into small fragments and these fragments are ejected to the outside, rearward, passing through the combustion chamber and the thrust nozzle.

In consequence, the blanking plug is completely removed during ramjet operation.

However, during the operational use of such a ramjet, it may happen that the outer face of the glass plate of the blanking plug is subjected to various attacks (hailstones thrown against it during carry flight or during the boosted phase, loose chippings thrown up on take-off by the nosewheel of an aircraft carrying such a ramjet, various impacts, etc.) which may be capable of causing said glass plate to be destroyed.

In consequence, there is a risk of premature destruction of the blanking plug of the blanking-plug system of the ramjet, this being before the conditions required for switch to ramjet operation have been met.

It is an object of the present invention to overcome these disadvantages. The invention relates to a blanking-plug system for blanking off an orifice of a pipe, in particular for blanking off an orifice of a duct for introducing air into the combustion chamber of a ramjet, that allows said orifice of the pipe to be opened up effectively at a given moment, while at the same time avoiding premature opening of said orifice.

To this end, according to the invention, said blanking-off plug system for blanking off an orifice of a pipe, which comprises:
  at least one blanking plug comprising a glass plate which is able to completely blank off said orifice of the pipe; and
  at least one device for destroying said glass plate of said blanking plug,
is notable in that said blanking plug additionally comprises a plurality of elastomer protective elements which are fixed on at least one first face of said glass plate which is likely to be subject to attack, these elements being separated from one another by a predetermined maximum distance at most, and completely covering said first face. As a preference, said maximum distance is roughly equal to 0.5 mm.

Thus, by virtue of said protective elements completely covering said first face of the glass plate, which is likely to be subject to attack, said glass plate is protected against inadvertent destruction, the spacings between said protective elements being such that they prevent said plate from being destroyed in their locality by the various possible attacks.

In addition, since said protective elements represent a plurality of individual pieces separate from each other, said destroying device is always able to destroy said blanking plug at the appropriate moment by acting, for example, in the conventional way on the opposite face to said face which is covered with said protective elements.

In particular, to facilitate the destruction of the glass plate by the destroying device, advantageously at least some of said protective elements have, on said first face of the glass plate a polygonal shape, the area of which is smaller than the area of the fragments of glass obtained when said glass plate is destroyed by said destroying device and/or the longest side of which is shorter than or equal to half the thickness of said glass plate.

In a preferred particular embodiment, said longest side of the polygonal shape is roughly equal to half the thickness of said glass plate.

Furthermore, advantageously:
  said polygonal shape is a square; and
  at least some of said protective elements are cubes.
Also, advantageously, said glass plate is made of a toughened glass.

Furthermore, in a particular embodiment, said destroying device comprises:
  at least one projectile able to destroy said glass blanking plug when thrown against the latter; and
  at least one controllable projection device capable of throwing said projectile against said blanking plug.

In a preferred application, the blanking-plug system according to the invention is intended to blank off an orifice of a duct for introducing combustion air into the combustion chamber of a ramjet, said ramjet being able, in a known way, in an initial phase of operation corresponding to said ramjet being brought up to speed, of operating as a rocket using a consumable auxiliary thruster arranged in said combustion chamber then, when said ramjet reaches a predetermined speed, of operating as an actual ramjet with fuel and combustion air injected into said combustion chamber, and said blanking-plug system comprising, in a known way:

- at least one blanking plug comprising a glass plate able to completely blank off said orifice during said initial phase of operation of the rocket; and
- at least one destroying device capable of destroying said glass plate of said glass blanking plug so as to open said orifice, for operation as a ramjet.

According to the invention, said blanking-plug system has the aforementioned features, the face likely to be subject to attack being the outer face of said glass plate.

The present invention also relates to a ramjet equipped with a blanking-plug system such as the aforesaid, and to a missile comprising such a ramjet.

The figures of the appended drawing will make it easy to understand how the invention may be achieved. In these figures, identical references denote similar elements.

FIG. 1 depicts schematically, for explanatory purposes, a missile 1, of longitudinal axis X—X, propelled by a ramjet 2 of known type.

Figure 1:
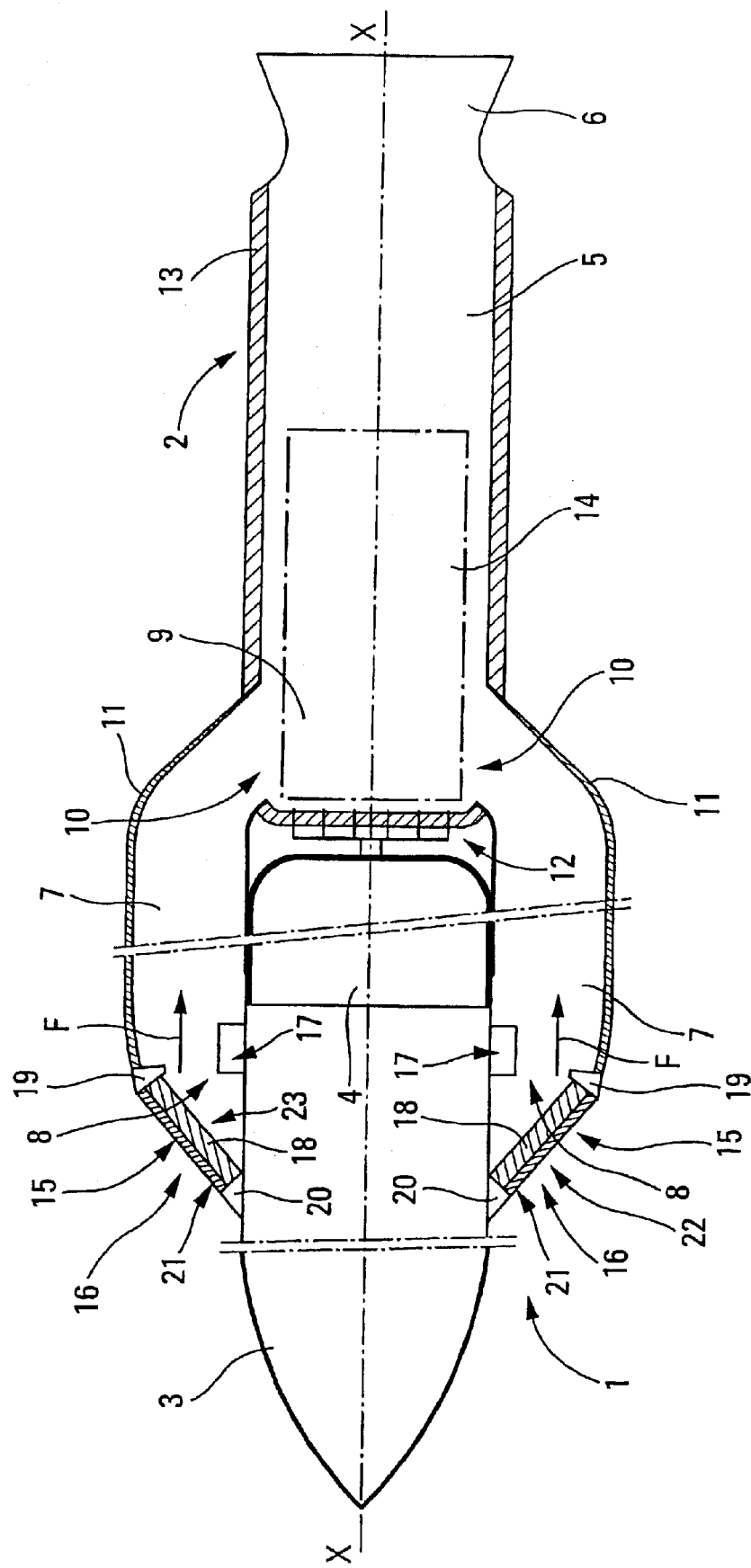
FIG. 1 shows schematically, in longitudinal part section, a missile equipped with a ramjet of known type, the air inlet ducts of which are provided with blanking plugs forming part of blanking-plug systems according to the invention.

The missile 1 comprises a body 3 containing, amongst other things, the usual apparatus and payloads (which are not depicted because the invention does not relate to these) and a tank of fuel 4 intended to supply the ramjet 2 and fixed to the rear part of said body 3.

The ramjet 2 comprises a combustion chamber 5 ending at the rear in a jetpipe 6 and connected, at the front, to a plurality of air inlet ducts of the air inlet type 7.

The air inlets 7 are arranged at the periphery of the body 3 and secured to the latter. Each of them, toward the front, has an air intake orifice 8 and, toward the rear, opens into the front part 9 of the combustion chamber 5 via an air outlet orifice 10 of the inlet 7.

There is an elbow 11 in each air inlet 7 to connect the part thereof fixed to the exterior wall of the body 3 to the orifice 10 corresponding to the entry into the combustion chamber 5.

Near the front part 9 of the combustion chamber 5 there is a fuel injection device 12. The device 12 is controlled by a fuel supply and regulation device (not depicted) borne by the body 3 and connected to the tank 4.

A thermal protection coating 13 is provided on the internal walls of the combustion chamber 5.

The way the missile 1 works is as follows.

Initially, after the missile 1 has been released from its carrier, with the ramjet 2 not in service, the missile 1 is propelled by a consumable auxiliary thruster 14 (for example a powder charge) housed inside the combustion chamber 5.

When the auxiliary thruster 14 is in operation, the air inlets 7 are blanked off, by blanking plugs 15 forming part of blanking-plug systems 16 according to the invention and specified hereinbelow.

At the end of the operation of the thruster 14, when the latter has been fully consumed, said blanking plugs 15 are opened and incoming air (arrows F) entering the air inlets 7 through the orifices 8 is conveyed into the combustion chamber 5 through the orifices 10.

In addition, also at the end of operation of the consumable thruster 14, the supply and regulation device supplies the injection device 12 with fuel and the latter is ignited. The ramjet then comes into operation and takes over from the thruster 14 (which has disappeared) to propel the missile 1.

The characteristics according to the invention are described hereinafter for a single blanking-plug system 16, it being understood that these features hold for all the blanking-plug systems 16 of the ramjet 2.

Said blanking-plug system 16 is of the type comprising:

- said blanking plug 15 which comprises a frangible (fragmentable) glass plate 18 specified hereinbelow mounted, via customary means 19 and 20, at an orifice of the air inlet 7 so as to completely blank off this orifice; and
- a destroying device 17 for destroying said blanking plug 15 by fragmentation so as to open up said orifice.

Said blanking plug 15 blanks off the intake orifice 8 into the air inlet 7 which lies upstream of the latter in the direction F of flow of the air in said air inlet 7.

In one particular embodiment, not depicted, said destroying device 17 comprises:

- at least one projectile capable of destroying said glass blanking plug 15 when thrown against the latter; and
- a controllable projection device, for example a customary pyrotechnic striker, capable of driving said projectile and which is arranged outside the air inlet 7, while at the same time being directed in such a way as to be able to throw said projectile against said blanking plug 15.

Since the blanking plug 15 is made of glass and by virtue of the effectiveness of the destroying device 17, the glass is broken up into small fragments which are removed by the combustion air and ejected from the ramjet 2, at the rear, via the air inlet 7, the combustion chamber 5 and the jetpipe 6. In consequence, the blanking plug 15 is completely eliminated once it has been destroyed.

According to the invention, in order to prevent premature opening of said orifice 8 following external attack (hailstones, various impacts, etc.), said blanking plug 15 additionally comprises a plurality of protective elements 21 which are made of elastomer, which are fixed on the outer face 22 of said glass plate 18, that is to say on the face likely to be subjected to (external) attack, these elements being separated from one another by at most a predetermined maximum distance, and completely covering said outer face 22.

Thus, by virtue of said protective elements 21 which completely cover said outer face 22 (which is likely to be subjected to attack) of the glass plate 18, said glass plate 18 is protected against inadvertent destruction, the spacings e (FIG. 2) between said protective elements 21 being, according to the invention, such that they prevent said plate 18 from being destroyed in their locality by external attack.

As a preference, said spacings e are uniform and are, for example, roughly equal to 0.5 mm.

In addition, as said protective elements 21 represent a plurality of individual pieces separate from one another, said destroying device 17 is always able to destroy said blanking plug 15 at the appropriate moment by acting, preferably in the usual way, on the opposite face 23 to said face 22, said face 23 not being covered with protective elements 21.

To make it easier for the destroying device 17 to destroy the glass plate 18, said protective elements 21 have, on said outer face 22 of the glass plate 18, a polygonal shape, preferably a square shape (with sides l and L equal), the area of which is smaller than the area of the fragments of glass obtained as said glass plate 18 is destroyed by said destroying device 17 and/or shapes in which the longest side l or L is smaller than or equal to half the thickness E of said glass plate 18.

In one preferred particular embodiment, said longest side l or L of the polygonal shape is roughly equal to half the thickness E of said glass plate 18.

By way of example, the sides l and L may be roughly equal to 4 mm and the thickness E roughly equal to 8 mm.

As to the height H of said protective elements 21, this needs to be enough to allow effective damping of attacks. It therefore depends upon the elastomeric material used and on the feared external attacks.

Figure 2:
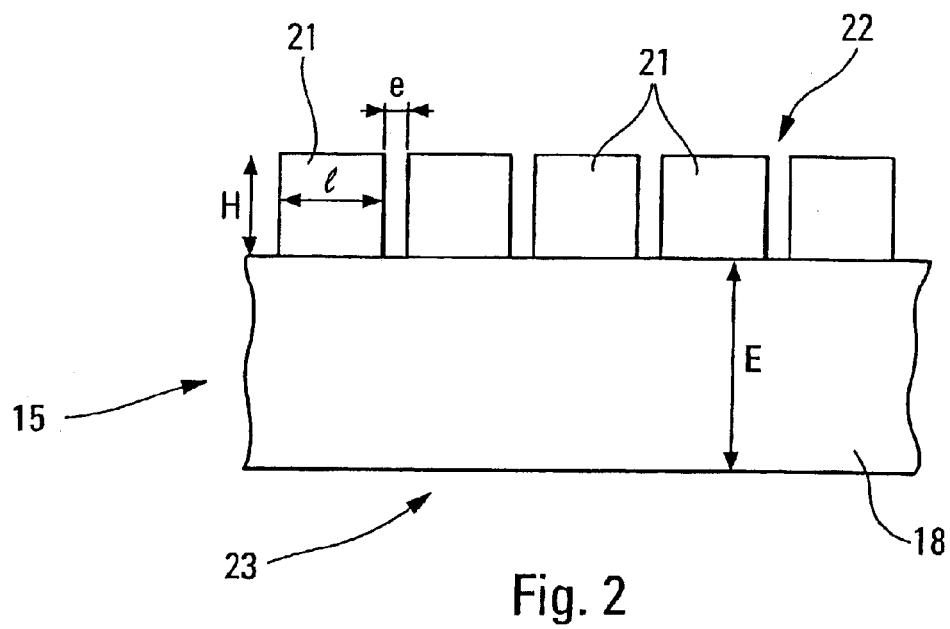
FIGS. 2 and 3 show, in part, in a side view and in a plan view respectively, one preferred embodiment of a blanking plug according to the invention.
Figure 3:
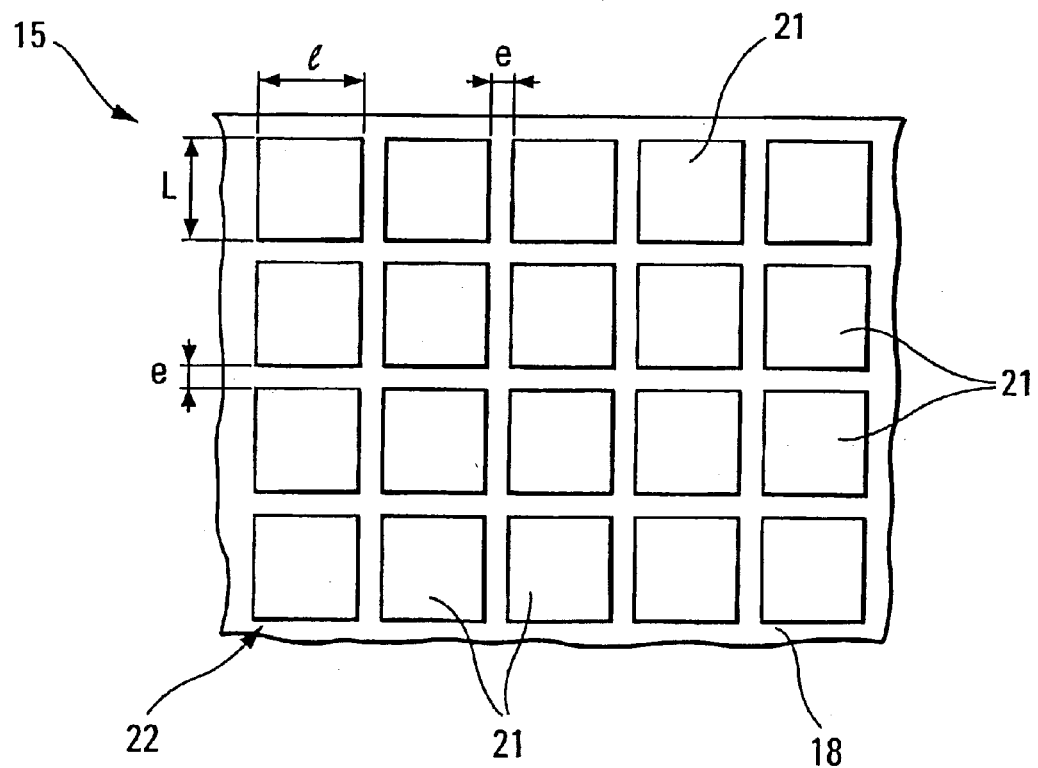

In the preferred embodiment depicted in FIGS. 2 and 3, said protective elements 21 are cubes, which means that H=l=L.

Furthermore, in a preferred embodiment:

said glass plate 18 is made of a toughened glass, such as toughened soda-lime glass "T152"; and said elastomer is "60 Shore" silicone (MF 370+MF 345).

What is claimed is:

1. A blanking-plug system for blanking off an orifice of a duct for introducing combustion air into the combustion chamber of a ramjet, said ramjet being able, in an initial phase of operation corresponding to said ramjet being brought up to speed, of operating as a rocket using a consumable auxiliary thruster arranged in said combustion chamber then, when said ramjet reaches a predetermined speed, of operating as an actual ramjet with fuel and combustion air injected into said combustion chamber, and said blanking-plug system comprising:

at least one blanking plug comprising a glass plate able to completely blank off said orifice during said initial phase of operation of the rocket; and at least one destroying device capable of destroying said glass plate of said blanking plug so as to open said orifice, for operation as a ramjet, wherein said blanking plug additionally comprises a plurality of elastomer protective elements which are fixed on the outer face of said glass plate, these elements being separated from one another by a predetermined maximum distance at most, and completely covering said outer face.

2. A ramjet comprising a combustion chamber provided with at least one duct for introducing combustion air into said combustion chamber, and a blanking-plug system for blanking off an orifice of said duct for introducing combustion air, wherein said blanking-plug system is of the type specified in claim 1.

3. A missile which comprises a ramjet as claimed in claim 2.

4. The blanking-plug system as claimed in claim 1, wherein said maximum distance is roughly equal to 0.5 mm.

5. The blanking-plug system as claimed in claim 1, wherein at least some of said protective elements have, on said first face of the glass plate a polygonal shape, the area of which is smaller than the area of the fragments of glass obtained when said glass plate is destroyed by said destroying device.

6. The blanking-plug system as claimed in claim 1, wherein at least some of said protective elements have, on said first face of the glass plate, a polygonal shape, of which the longest side is shorter than or equal to half the thickness of said glass plate.

7. The blanking-plug system as claimed in claim 6, wherein said longest side of the polygonal shape is roughly equal to half the thickness of said glass plate.

8. The blanking-plug system as claimed in claim 5, wherein said polygonal shape is a square.

9. The blanking-plug system as claimed in claim 1, wherein at least some of said protective elements are cubes.

10. The blanking-plug system as claimed in claim 1, wherein said glass plate is made of a toughened glass.

11. The blanking-plug system as claimed in claim 1, wherein said destroying device comprises:

at least one projectile able to destroy said glass blanking plug when thrown against the latter; and at least one controllable projection device capable of throwing said projectile against said blanking plug.

* * * * *